(12) United States Patent
Emoto

(10) Patent No.: US 6,530,774 B2
(45) Date of Patent: Mar. 11, 2003

(54) ELECTRIC INJECTION MOLDING MACHINE

(75) Inventor: Atsushi Emoto, Togane (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/782,515

(22) Filed: Feb. 14, 2001

(65) Prior Publication Data

US 2001/0016216 A1 Aug. 23, 2001

(30) Foreign Application Priority Data

Feb. 15, 2000 (JP) ........................................ 2000-036487

(51) Int. Cl.⁷ .............................................. B29C 45/50
(52) U.S. Cl. ...................................... 425/542; 425/572
(58) Field of Search ................................ 425/145, 150, 425/542, 574

(56) References Cited

U.S. PATENT DOCUMENTS

| | | |
|---|---|---|
| 5,129,808 A | 7/1992 | Watanabe et al. |
| 5,679,384 A | 10/1997 | Emoto .................. 425/145 |
| 5,747,076 A | 5/1998 | Jaroschek et al. |
| 6,227,839 B1 | 5/2001 | Yoshida et al. |

FOREIGN PATENT DOCUMENTS

| | | |
|---|---|---|
| DE | 547950 | 11/1929 |
| EP | 0 350 872 A1 | 1/1990 |
| EP | 0 743 167 A3 | 11/1996 |
| EP | 0 882 564 A1 | 12/1998 |

Primary Examiner—Tim Heitbrink

(57) ABSTRACT

An object of the invention is to provide an injection molding machine that can decrease mechanical vibration in an injection stage, that can meet a predetermined injection speed rapidly, and that has the high reliability of electric wires to supply electricity to the metering motor. An injection molding machine has a mechanical frame comprising a front plate and a rear plate, a heating cylinder fixed to the front plate, a screw disposed inside the heating cylinder so that the screw can be rotated about and can be advanced and retracted along an axis, a ball screw shaft which is disposed along the axis and which advances and retracts a screw shaft, a metering motor fixed to the front plate, and a rotation transmission mechanism which transmits rotation of the metering motor to the screw shaft. The rotation transmission mechanism is supported by the front plate and slidably engaged with the ball screw shaft along the axis. Consequently, since the metering motor fixed to the front plate is not moved by the advancing and retracting motion of the ball screw shaft, the mass of the moved portion is small so that mechanical vibration is decreased in the injection stage. A predetermined injection speed is also met rapidly. Moreover, the reliability of electric wires to supply electricity to the metering motor is improved.

19 Claims, 4 Drawing Sheets

ELECTRIC INJECTION MOLDING MACHINE

DESCRIPTION OF THE INVENTION

Field of the Invention

The invention relates to an electric injection molding machine. It relates especially to a transmission mechanism that transmits rotation of a motor to a screw shaft in the electric injection molding machine.

BACKGROUND OF THE INVENTION

In an injection molding machine, resin heated and melted in a heating cylinder is injected into a cavity of a mold apparatus under high pressure so that the cavity is filled with the molten resin. The molten resin is then cooled and solidified so as to obtain a molded article.

The injection molding machine includes a mold clamping apparatus and an injection apparatus. The mold clamping apparatus is provided with a stationary platen, a movable platen and a mold clamping cylinder. The movable platen is advanced and retracted by the mold clamping cylinder, to thereby perform mold closing, mold clamping and mold opening.

The injection apparatus includes a heating cylinder for heating and melting resin supplied from a hopper, and an injection nozzle for injecting the molten resin. A screw is disposed inside the heating cylinder so that the screw can be rotated about an axis and can be advanced and retracted, i.e. moved rectilinearly along the axis of rotation. The screw is advanced so as to inject the molten resin, and retracted so as to meter the molten resin.

There has been provided an electric injection molding machine in which an electric motor is used to advance and retract the screw.

FIG. 1 is a schematic view of a conventional electric injection molding machine. In FIG. 1, a screw 101 is disposed inside a heating cylinder 100 so that the screw 101 can be rotated and can be advanced and retracted (i.e. moved leftward and rightward in FIG. 1). The rear end (rightward end in FIG. 1) of the screw 101 is fixed to a bearing box 109. At the rear (rightward in FIG. 1) of the heating cylinder 100, a drive section 102 is disposed for rotating, advancing and retracting the screw 101. The drive section 102 includes a frame 103, a metering motor 104 disposed movably forward and backward (leftward and rightward in FIG. 1) relative to the frame 103, and an injection motor 105 fixed to the frame 103.

A guide bar 106 is disposed on the frame 103 so that the guide bar 106 extends parallel with the screw 101. A support plate 107 is slidably disposed relative to the guide bar 106. The metering motor 104 is fixed to the support plate 107. Therefore, the metering motor 104 is moved forward and backward (leftward and rightward in FIG. 1) along the guide bar 106.

A drive-side pulley 108 is fixed to the output shaft of the metering motor 104. A driven-side pulley 110 is fixed around the outer surface of the bearing box 109. A timing belt 111 is extended between and wound around the drive-side pulley 108 and the driven-side pulley 110. The drive-side pulley 108, the driven-side pulley 110 and the timing belt 111 constitute the rotation transmission mechanism that connects the bearing box 109 and the metering motor 104.

In an injection stage, when the injection motor 105 is driven, the rotation of the injection motor 105 is transmitted to a ball screw shaft 112. Since a ball nut 113 is fixed to the frame 103, the ball screw shaft 112 is advanced while being rotated, so that the screw 101 is also advanced.

In this conventional injection molding machine, the metering motor 104, the support plate 107 and the bearing box 109 are moved by the advancing and retracting motion of the ball screw shaft 112. Therefore, mechanical vibration is increased in the injection stage since the mass of the moved portion is large. Meeting a predetermined injection speed is also delayed. Moreover, the reliability of electric wires to supply electricity to the metering motor 104 is deteriorated since the metering motor 104 is moved.

SUMMARY OF THE INVENTION

It is an object of the invention to provide an electric injection molding machine that can decrease mechanical vibration in the injection stage.

Another object of the invention is to provide an electric injection molding machine that can meet a predetermined injection speed rapidly.

A further object of the invention is to provide an electric injection molding machine that has the high reliability of electric wires to supply electricity to the metering motor.

To achieve the above object, an electric injection molding machine is provided and has a mechanical frame comprising a front plate and a rear plate, a heating cylinder fixed to the front plate, a screw disposed inside the heating cylinder so that the screw can be rotated about and can be advanced and retracted along an axis, a ball screw shaft which is disposed along the axis and which advances and retracts a screw shaft, a metering motor fixed to the front plate, and a rotation transmission mechanism which transmits rotation of the metering motor to the screw shaft. The rotation transmission mechanism is supported by the front plate and slidably engaged with the ball screw shaft along the axis.

The electric injection molding machine according to the invention further includes the heating cylinder fixed to a front portion of the front plate, the front plate having a cavity inside thereof, and the rotation transmission mechanism disposed inside the cavity.

The rotation transmission mechanism further includes a hollow shaft driven by the metering motor, a gear train which connects the hollow shaft to an output shaft of the metering motor, a screw support plate fixed to a rear end of the screw shaft, a bearing holder connected with the screw support plate and rotatably connected with a front end of the ball screw shaft, first spline cogs formed on an inner cylindrical surface of the hollow shaft, and second spline cogs formed on the bearing holder and slidably engaged with the first spline cogs along the axis.

Consequently, since the metering motor and the hollow shaft are not moved by the advancing and retracting motion of the ball screw shaft, the mass of the moved portion is small so that mechanical vibration is decreased in the injection stage. A predetermined injection speed is also met rapidly. Moreover, the reliability of electric wires to supply electricity to the metering motor is improved.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

The invention disclosed herein will be better understood with reference to the following drawings of which.

DESCRIPTION OF PREFERRED EMBODIMENT

A preferred embodiment of the invention will next be described in detail with reference to the drawings.

Figure 1:
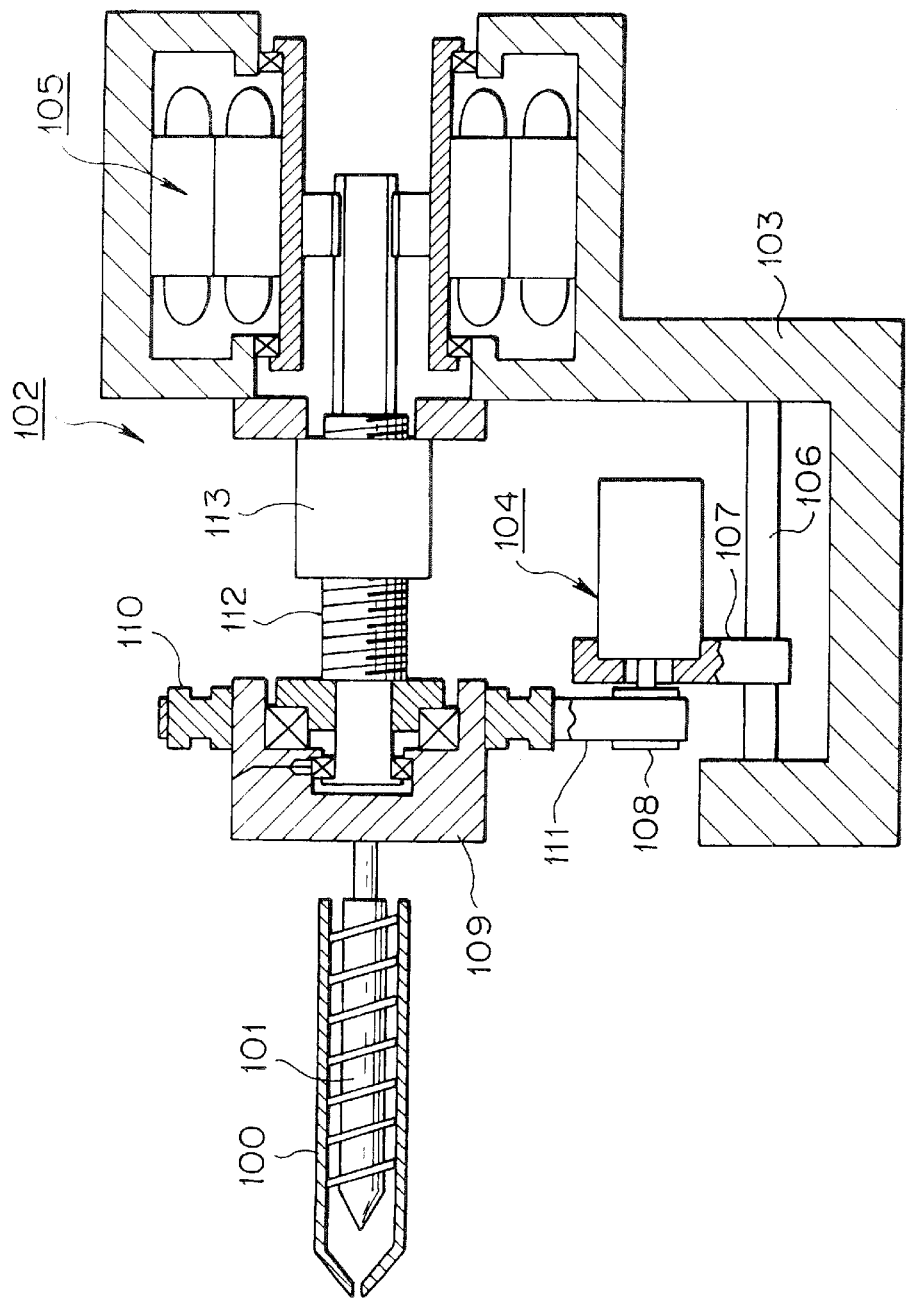
FIG. 1 is a schematic view of a conventional electric injection molding machine.
Figure 2:
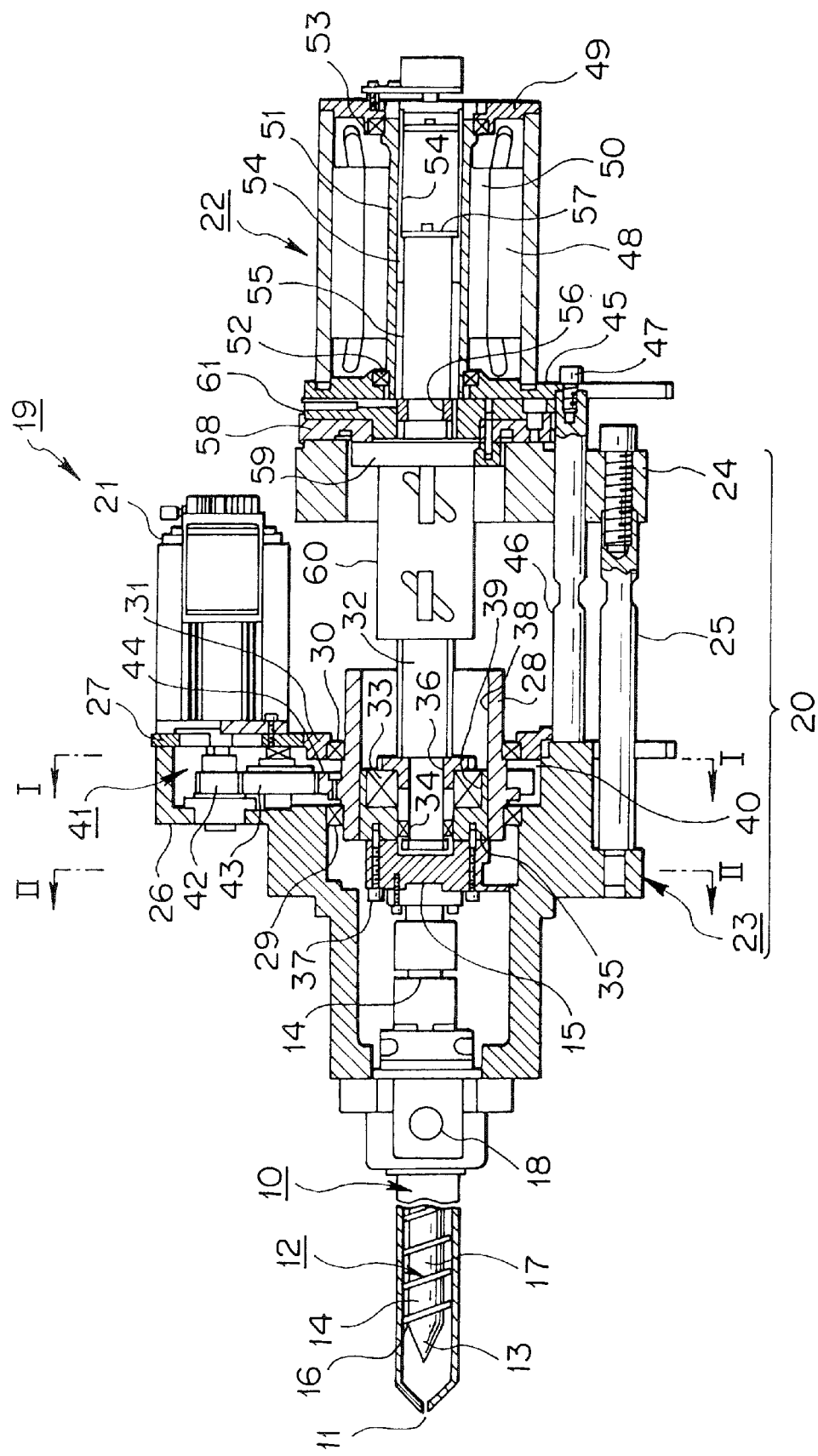
FIG. 2 is a transverse sectional view embodying the invention.
Figure 3:
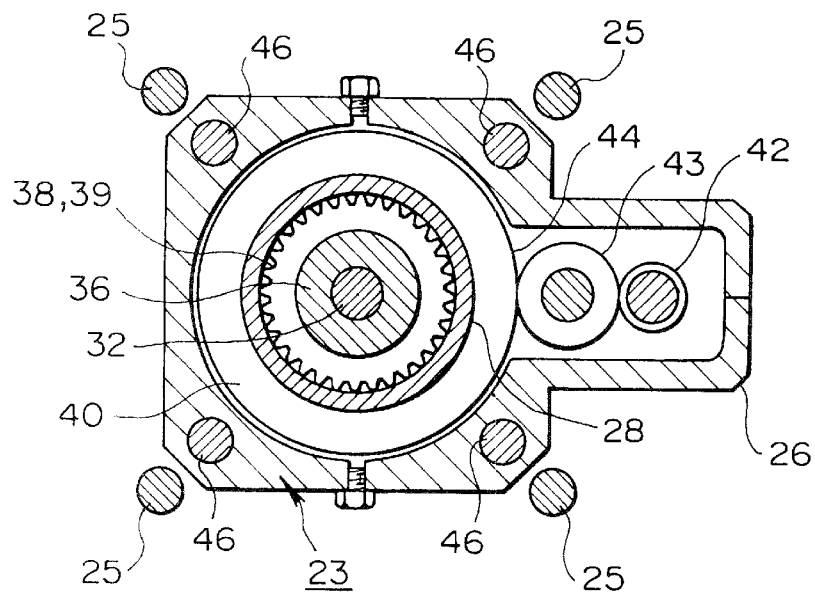
FIG. 3 is a cross sectional view taken on line I of FIG. 2.
Figure 4:
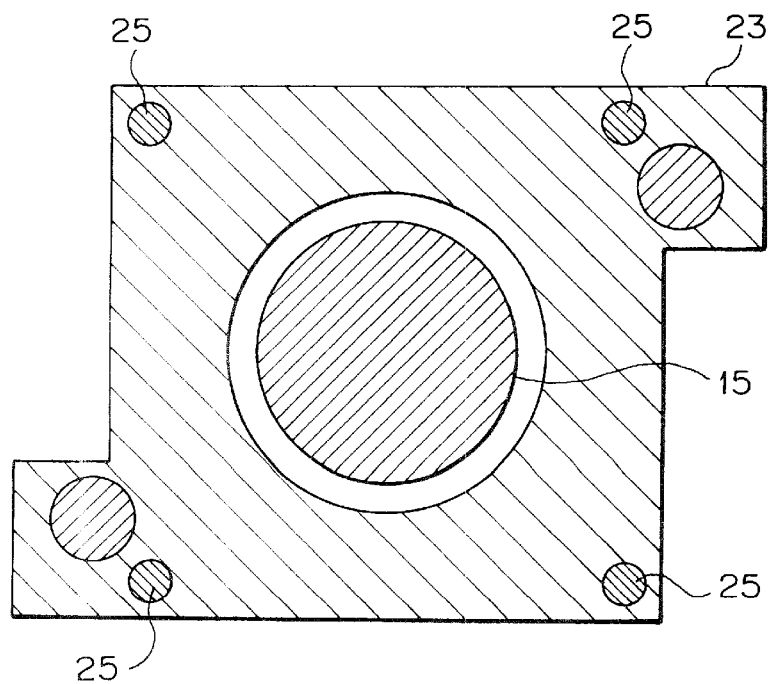
FIG. 4 is a cross sectional view taken on line II of FIG. 2.
Figure 5:
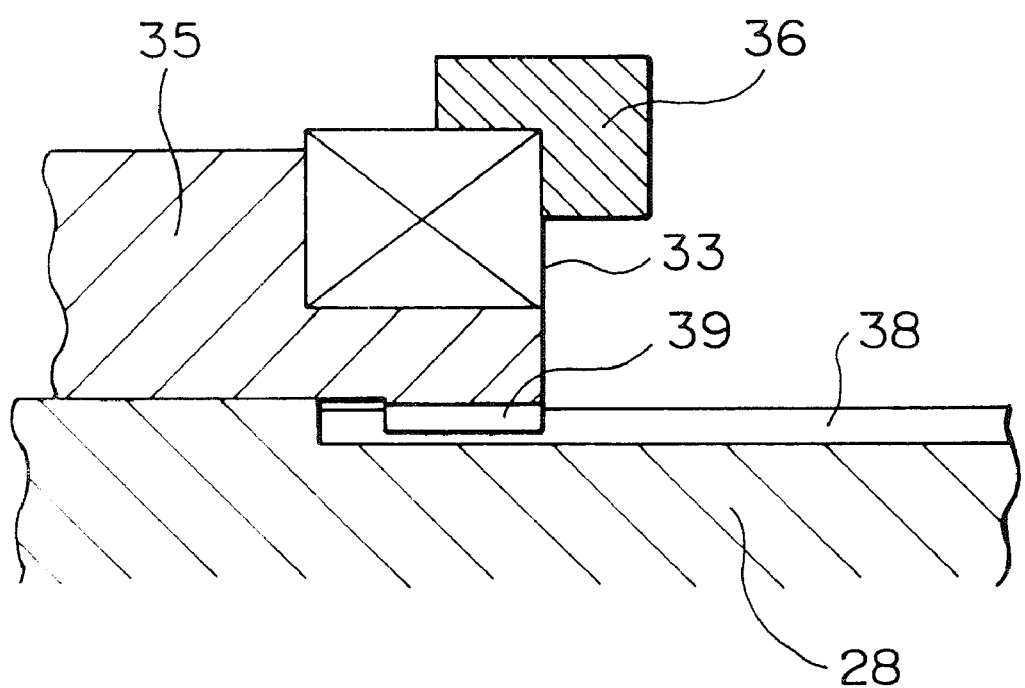
FIG. 5 is a fragmentary side view, on an enlarged scale, of a spline part in FIG. 2.

FIG. 2 is a transverse sectional view embodying the invention. In FIG. 2, a screw 12 is disposed inside the heating cylinder 10 so that the screw 12 can be rotated about and can be advanced and retracted (i.e. moved leftward and rightward in FIG. 2) along an axis. The screw 12 has a screw head 13 at its front end (leftward end in FIG. 2) and a screw shaft 14 that extends along the axis and rearward (rightward in FIG. 2) inside the heating cylinder 10. A rear end (rightward end in FIG. 2) of the screw shaft 14 is fixed to a screw support plate 15. On a surface of the screw 12, a spiral flight 16 is formed. The spiral flight 16 forms a groove 17.

A resin supply port 18 is formed in the heating cylinder 10. The resin supply port 18 is formed at a portion where the resin supply port 18 faces a rear end portion (rightward end portion in FIG. 2) of the groove 17 when the screw 12 is positioned at a forwardmost position (leftward in FIG. 2) inside the heating cylinder 10. On the resin supply port 18, a hopper not illustrated is disposed. A heater not illustrated is disposed around the heating cylinder 10.

In a metering stage, the screw 12 is retracted (i.e. moved rightward in FIG. 2) by a predetermined amount while being rotated, so that pellet-shaped resin is fed from the hopper into the heating cylinder 10. The heating cylinder 10 is heated by the heater, and then, the resin is melted inside the heating cylinder 10. While the screw 12 is rotated, the screw 12 is retracted by a pressure of the molten resin. The molten resin, for one injection, is then accumulated at a front side of the screw head 13.

In a subsequent injection stage, when the screw 12 is advanced without being rotated, the molten resin accumulated at the front side of the screw head 13 is injected from an injection nozzle 11 so that a cavity of a mold apparatus not illustrated is filled with the molten resin.

At a rear (rightward in FIG. 2) of the heating cylinder 10, a screw drive section 19 is disposed for rotating, advancing and retracting the screw 12. The screw drive section 19 includes a mechanical frame 20, a metering motor 21 and an injection motor 22. The mechanical frame 20 comprises a front plate 23 which supports the heating cylinder 10 and a rear plate 24 which supports a ball nut 60. The front plate 23 and the rear plate 24 are connected and fixed by connecting rods 25. A lateral projection 26 projects from a rear (rightward in FIG. 2) of the front plate 23 laterally (upward in FIG. 2). The metering motor 21 is fixed to the lateral projection 26 via a motor flange 27. The injection motor 22 is disposed about the same axis as the screw 14 at a rear (rightward in FIG. 2) of the rear plate 24.

Inside the front plate 23, a hollow shaft 28 is rotatably supported by bearings 29 and 30. The bearing 30 is held by a bearing holder 31. The hollow shaft 28 is rotatably supported at a front (leftward in FIG. 2) of a ball screw shaft 32 by bearings 33 and 34. The bearing 33 is held by a bearing holder 35 and a bearing holder 36. The bearing 34 is held by the bearing holder 35. The bearing holder 35 is connected to a rear (rightward in FIG. 2) of the screw support plate 15 by a bolt 37.

Spline cogs 38 project outwardly on an inner cylindrical surface of the hollow shaft 28. Spline cogs 39 project outwardly on an outer cylindrical surface of the bearing holder 35. The spline cogs 38 are slidably and matably engaged with the spline cogs 39. Therefore, the bearing holder 35 can slide forward and backward (leftward and rightward in FIG. 2) relative to the hollow shaft 28 along the axis in an axial direction.

Inside the front plate 23, the hollow shaft 28, the bearing holder 31, the motor flange 27, and the lateral projection 26 formed at the rear of the front plate 23, surround a cavity 40. In the cavity 40, a rotation transmission mechanism 41 is disposed. The rotation transmission mechanism 41 includes a drive-side gear 42, a middle gear 43 and a driven-side gear 44. The drive-side gear 42 is fixed to a front edge (leftward in FIG. 2) of an output shaft of the metering motor 21. The drive-side gear 42 is matably engaged with the middle gear 43. The middle gear 43 is matably engaged with the driven-side gear 44. The driven-side gear 44 is annular and is fixed around an outer circumference of the hollow shaft 28.

In this embodiment, a gear train is used as the rotation transmission mechanism 41. A mechanism with pulleys and a timing belt publicly known may also be applied to the rotation transmission mechanism 41 instead of the drive-side gear 42, the middle gear 43 and the driven-side gear 44. For example, pulleys (instead of the drive-side gear 42 and the driven-side gear 44) connected by a timing belt (instead of the middle gear 43) may be applied to the rotation transmission mechanism 41.

The injection motor 22 is fixed to a rear (rightward end in FIG. 2) of an injection motor support member 45 and is disposed about the same axis as the screw shaft 14. The injection motor support member 45 is fixed to a rear end (rightward end in FIG. 2) of rods 46 by a screw 47. The rods 46 penetrate the rear plate 24.

The injection motor 22 comprises a stator 48 fixed to a motor frame 49, and a rotor 50 disposed inside the stator 48. The rotor 50 is rotatably supported relative to the motor frame 49. For this purpose, a hollow rotor shaft 51 is fixedly fitted into the rotor 50. The rotor shaft 51 is supported by the motor frame 49 via bearings 52 and 53 at both ends of the rotor shaft 51. Inside the rotor shaft 51, a spline nut 54 is fixed to it. At a rear end (right-side end in FIG. 2) of the ball screw shaft 32, a spline shaft 55 is fixed to it. The spline nut 54 is slidably and matably engaged with the spline shaft 55. The advancing and retracting motion of the spline shaft 55 is limited by a retraction limiter 56 and an advance limiter 57.

A load cell 58 is fixed between the rear plate 24 and a flange 59 disposed at a rear (rightward end in FIG. 2) of a ball nut 60. At a rear of the load cell 58, an oil supply plate 61 with a mouth to pour oil is fix to it.

Consequently, during a metering stage, the rotation generated through drive of the metering motor 21 is sequentially transmitted to the drive-side gear 42, the middle gear 43, the driven-side gear 44 and the hollow shaft 28. The rotation of the hollow shaft 28 is further transmitted to the screw shaft 14 via the spline cogs 38 formed on the inner cylindrical surface of the hollow shaft 28, the spline cogs 39 formed on the outer cylindrical surface of the bearing holder 35, and the screw support plate 15. The screw 12 is then rotated so that the molten resin can be accumulated at the front side of the screw head 13.

During a sequential injection stage, the rotation generated through drive of the injection motor 22 is transmitted to the hollow rotor shaft 51. The rotation of the rotor shaft 51 is transmitted to the spline shaft 55. The rotation of the spline shaft 55 is further transmitted to the ball screw shaft 32 fixed to the front of the spline shaft 55. The ball nut 60 then advances the ball screw shaft 32. The advance motion of the ball screw shaft 32 is transmitted to the screw shaft 14 via the bearing holder 35 and the screw support plate 15. The screw shaft 14 is advanced without being rotated. By the advance motion of the screw 12, the molten resin accumulated at the front side of the screw head 13 is then injected from the injection nozzle 11 so that the cavity of the mold apparatus not illustrated is filled with the molten resin.

In this stage, the hollow shaft 28 is not moved forward and backward (leftward and rightward in FIG. 2) because the hollow shaft 28 is slidably and matably engaged with the bearing holder 35 connected to the screw support plate 15. The metering motor 21 is not. moved forward and backward (leftward and rightward in FIG. 2) either because the metering motor is fixed to the front plate 23.

Consequently, since the metering motor 21 and the hollow shaft 28 are not moved by the advancing and retracting motion of the ball screw shaft 32, the mass of the moved portion is small so that mechanical vibration is decreased in the injection stage. A predetermined injection speed is also met rapidly. Moreover, the reliability of electric wires to supply electricity to the metering motor 21 is improved.

The present invention is not limited to the above-described embodiments, numerous modifications and variations of the invention are possible in light of the spirit of the invention, and they are not excluded from the scope of the invention.

What is claimed is:

1. An electric injection molding machine comprising:
    a mechanical frame comprising a front plate and a rear plate;
    a heating cylinder fixed to the front plate;
    a screw disposed inside the heating cylinder so that the screw can be rotated about and can be advanced and retracted along an axis;
    a ball screw shaft disposed along the axis, the ball screw shaft advancing and retracting a screw shaft;
    a metering motor non-slidably attached to the front plate; and
    a rotation transmission mechanism which transmits rotation of the metering motor to the screw shaft, the rotation transmission mechanism supported by the front plate and slidably engaged with the ball screw shaft along the axis.

2. An electric injection molding machine according to claim 1, wherein the heating cylinder is fixed to the front portion of the front plate, the front plate having a cavity inside thereof, and the rotation transmission mechanism disposed inside the cavity.

3. An electric injection molding machine according to claim 1, wherein the rotation transmission mechanism includes a hollow shaft driven by the metering motor, a gear train which connects the hollow shaft to an output shaft of the metering motor, a screw support plate fixed to a rear end of the screw shaft, a bearing holder connected to the screw support plate and rotatably connected with a front end of the ball screw shaft, first spline cogs formed on an inner cylindrical surface of the hollow shaft, and second spline cogs formed on the bearing holder and slidably engaged with the first spline cogs along the axis.

4. An injection molding machine, comprising:
    a frame;
    an injector assembly extending along a longitudinal axis and mounted to the frame, the injector assembly including a hollow heating cylinder and a screw having a spiral flight and disposed within the hollow heating cylinder for rotation about and rectilinear movement along the longitudinal axis;
    a metering motor fixedly connected to the frame, disposed offset relative to the longitudinal axis and operative to rotate the screw; and
    a drive mechanism connected to the frame and operative to move the screw rectilinearly along the longitudinal axis.

5. An injection molding machine according to claim 4, further comprising a hollow shaft, and a bearing holder slidably engaged interiorly to the hollow shaft along the longitudinal axis and fixedly connected to a first end of the screw so that the screw and the bearing holder rotate simultaneously about the longitudinal axis along with the hollow shaft.

6. An injection molding machine according to claim 5, wherein the hollow shaft includes inner splines extending longitudinally therein and the bearing holder includes outer splines extending longitudinally on an outer surface thereof, the inner splines of the hollow shaft and the outer splines of the bearing holder being in sidable and matable engagement with each other.

7. An injection molding machine according to claim 5, further comprising a transmission mechanism operably connected to and between the metering motor and the hollow shaft for imparting rotational movement produced by the metering motor to the hollow shaft, the bearing holder and the screw.

8. An injection molding machine according to claim 7, wherein the transmission mechanism is a gear train and wherein the hollow shaft includes an outer cylindrical surface having a driven-side gear attached thereto and extending circumferentially therearound.

9. An injection molding machine according to claim 8, wherein the gear train includes a drive-side gear attached to the metering motor, the driven-side gear and a middle gear operably engaged to and between the drive-side gear and the driven-side gear so that, upon activation of the metering motor, the rotational movement produced by the metering motor is transferred sequentially from the drive-side gear and to the middle gear and the driven-side gear.

10. An injection molding machine according to claim 5, wherein the drive mechanism includes a ball screw shaft and a drive unit, the ball screw shaft disposed coaxially within the hollow shaft along the longitudinal axis and connected to the bearing holder for rotation independent of the hollow shaft, the bearing holder and the screw, the drive unit operably connected to the ball screw shaft so that the drive unit, upon activation, imparts rectilinear movement to the screw through the ball screw shaft.

11. An injection molding machine according to claim 10, wherein the drive unit includes a drive shaft assembly and an injection motor connected to the frame and having a rotor and a stator surrounding the longitudinal axis for imparting rotational movement to the drive shaft assembly coaxially aligned with the longitudinal axis.

12. An injection molding machine according to claim 11, wherein the drive shaft assembly includes a hollow rotor shaft having a series of longitudinally extending interior splines and a splined shaft connected to the ball screw shaft at one end and sized and adapted for sidable and matable engagement with the interior splines of the hollow rotor shaft at an opposite end such that, as the hollow rotor shaft rotates, the splined shaft and the ball screw shaft rotate while the opposite end of the splined shaft is permitted to slide within the hollow rotor shaft during rotation.

13. An injection molding machine according to claim 12, wherein the drive unit further comprises a ball nut fixedly connected to the frame, the ball nut having an opening disposed centrally about the longitudinal axis and defined by an internal surface formed with internal spiral threads, the opening sized to matably engage the ball screw shaft having a cylindrical outer surface formed with exterior spiral threads such that, when rotation is imparted to the ball screw shaft, the ball screw shaft and the splined shaft move rectilinearly along the longitudinal axis.

14. An injection molding machine according to claim 5, wherein the drive mechanism includes a ball nut fixedly connected to the frame, a drive motor attached to the frame and a ball nut shaft assembly rotatably engaged with the ball nut such that, upon activation of the drive mechanism, the ball nut shaft assembly rotates about and moves rectilinearly along the longitudinal axis.

15. An injection molding machine according to claim 14, wherein the ball nut shaft assembly includes a ball screw shaft and a hollow rotor shaft, the ball screw shaft having a first end portion disposed coaxially within the hollow shaft, a splined portion disposed opposite the first end portion and having a series of longitudinally extending splines and a threaded intermediate portion disposed between the first end portion and the splined end portion and threadably engaged with the ball nut, the hollow rotor shaft having a series of longitudinally extending internal splines, wherein the splined portion of the ball screw shaft and the hollow rotor shaft are slidably and matably engaged with each other such that, when the ball nut shaft assembly rotates, the ball screw shaft at the first end portion moves the screw rectilinearly without rotation while the splined portion and the hollow rotor shaft simultaneously rotate in unison and slide relative to each other.

16. An injection molding machine according to claim 4, wherein the metering motor is fixedly connected to the frame in a manner such that an axis of rotation of the metering motor extends parallel to the longitudinal axis.

17. An injection molding machine according to claim 4, wherein the frame includes a front plate and a rear plate spaced apart from one another and connected to each other.

18. An injection molding machine according to claim 17, further comprising a plurality of connecting rods, respective ones of the connecting rods extending between the front and rear plates for connecting the front and rear plates together.

19. An injection molding machine, comprising:
    a frame;
    an injector assembly mounted to the frame and including a hollow heating cylinder and a screw having a spiral flight and disposed within the hollow heating cylinder;
    a metering motor fixedly connected to the frame, having a solid output shaft and operative to rotate the screw; and
    a drive mechanism connected to the frame and operative to move the screw rectilinearly.

* * * * *